United States Patent
Koshimizu et al.

(10) Patent No.: US 9,363,295 B2
(45) Date of Patent: Jun. 7, 2016

(54) MOBILE COMMUNICATION METHOD AND APPLICATION SERVER APPARATUS

(75) Inventors: Takashi Koshimizu, Tokyo (JP); Itsuma Tanaka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/117,136

(22) PCT Filed: May 10, 2012

(86) PCT No.: PCT/JP2012/062052
§ 371 (c)(1),
(2), (4) Date: Nov. 12, 2013

(87) PCT Pub. No.: WO2012/157528
PCT Pub. Date: Nov. 22, 2012

(65) Prior Publication Data
US 2014/0185525 A1      Jul. 3, 2014

(30) Foreign Application Priority Data

May 13, 2011   (JP) ................................. 2011-108859

(51) Int. Cl.
*H04W 4/00*         (2009.01)
*H04L 29/06*        (2006.01)
*H04W 68/00*        (2009.01)
(Continued)

(52) U.S. Cl.
CPC ........ *H04L 65/1003* (2013.01); *H04L 65/1016* (2013.01); *H04L 65/1063* (2013.01); *H04L 65/1069* (2013.01); *H04L 65/1083* (2013.01); *H04L 67/148* (2013.01); *H04W 36/0022* (2013.01); *H04W 68/00* (2013.01)

(58) Field of Classification Search
CPC ....................................................... H04W 80/04
USPC ............................................................ 370/328
See application file for complete search history.

(56) References Cited

U.S. PATENT DOCUMENTS

| 2006/0155814 A1* | 7/2006 | Bennett et al. ................ 709/207 |
| 2009/0323636 A1* | 12/2009 | Dillon et al. .................. 370/331 |
| 2011/0028130 A1* | 2/2011 | Swaminathan et al. ... 455/414.1 |

FOREIGN PATENT DOCUMENTS

| EP | 2 169 976 A1 | 3/2010 |
| EP | 2169976 A1 * | 3/2010 ............ H04W 72/04 |

(Continued)

OTHER PUBLICATIONS

International Search Report for corresponding International Application No. PCT/JP2012/062052, mailed Jun. 12, 2012 (4 pages).

(Continued)

*Primary Examiner* — Samina Choudhry
(74) *Attorney, Agent, or Firm* — Osha • Liang LLP

(57) ABSTRACT

A mobile communication method according to the present invention includes the steps of: when an S-CSCF in an IMS receives a terminating signal directed to a UE, sending the terminating signal from the S-CSCF to an SCC-AS in the IMS, the terminating signal including call-type information indicating whether the terminating signal is for voice communication or AV communication; sending an inquiry signal including the call-type information from the SCC-AS to an HSS; and determining, by the SCC-AS, a domain to which the terminating signal is to be transferred, based on the call-type information and a response signal received from the HSS as a response to the inquiry signal.

2 Claims, 4 Drawing Sheets

(51) Int. Cl.
*H04W 36/00* (2009.01)
*H04L 29/08* (2006.01)

(56) References Cited

FOREIGN PATENT DOCUMENTS

| | | |
|---|---|---|
| JP | 9-55982 A | 2/1997 |
| JP | 2009-522965 A | 6/2009 |
| WO | 2007/079578 A1 | 7/2007 |
| WO | 2007/079582 A1 | 7/2007 |
| WO | 2009/001714 A1 | 12/2008 |

OTHER PUBLICATIONS

Written Opinion for corresponding International Application No. PCT/JP2012/062052, mailed Jun. 12, 2012 (4 pages).
Office Action for corresponding Japanese Application No. 2011-108859, mailed Jun. 5, 2012 (8 pages).
3GPP TS 23.221 V10.0.0; "3rd Generation Partnership Project; Technical Specification Group Services and System Aspects; Architectural requirements (Release 10);" Mar. 2011 (48 pages).
3GPP TS 23.292 V10.3.0; "3rd Generation Partnership Project; Technical Specification Group Services and System Aspects; IP Multimedia Subsystem (IMS) centralized services; Stage 2 (Release 10);" Mar. 2011 (110 pages).
Office Action in counterpart Chinese Patent Application No. 201280023810.8 mailed on Apr. 16, 2014 (9 pages).
Search Report issued in corresponding European Application No. 12785168.1, mailed Oct. 24, 2014 (10 pages).
Office Action issued in corresponding Chinese Application No. 201280023810.8, mailed Sep. 26, 2014 (11 pages).
3GPP TS 23.221 V8.8.0; "3rd Generation Partnership Project; Technical Specification Group Services and System Aspects; Architectural requirements (Release 8)"; Mar. 2011 (47 pages).
Handley et al.; SDP: Session Description Protocol, XP015055003; Jul. 2006 (49 pages).
Official Action issued Dec. 9, 2015, in related Australian Patent Application No. 2012256918 (3 pages).
Office Action in counterpart Chinese Patent Application No. 201280023810.8, dated Nov. 12, 2015 (10 pages).
Office Action in counterpart Russian Patent Application No. 2013153897/07(084191), dated Sep. 10, 2015 (10 pages).
Office Action in counterpart European Patent Applicaion No. 12785168.1, dated Sep. 29, 2015 (8 pages).
Office Action in counterpart Australian Patent Application No. 2012256918, dated Apr. 16, 2015 (3 pages).
Office Action in counterpart Chinese Patent Application No. 201280023810.8, dated Apr. 28, 2015 (11 pages).

* cited by examiner

MOBILE COMMUNICATION METHOD AND APPLICATION SERVER APPARATUS

TECHNICAL FIELD

The present invention relates to a mobile communication method and an application server apparatus.

BACKGROUND ART

Conventionally, there is known a mobile communication system which can include a 2G/3G radio access system (UTRAN/GERAN (UTRAN: Universal Terrestrial Radio Access Network, GERAN: GSM EDGE Radio Access Network)) and an LTE (Long Term Evolution) radio access system (E-UTRAN: Evolved Universal Terrestrial Radio Access Network).

In such a mobile communication system, a UE (User Equipment, a mobile station) capable of accessing both the UTRAN/GERAN and the E-UTRAN can be provided with voice communication by either the UTRAN-GERAN or the E-UTRAN.

Such a mobile communication system is configured such that an IMS (IP Multimedia Subsystem, a service control network) can select a domain which is to provide voice communication to a UE, through "T-ADS (Terminated-Access Domain Selection)" (see Non-patent Documents 1 and 2).

With reference to FIG. 4, a description is given of an operation of selecting a domain which is to provide voice communication to a UE, through the "T-ADS."

As shown in FIG. 4, in Step S501, an S-CSCF (Serving Call Session Control Function, a call session control server apparatus) in the IMS receives a terminating signal for voice communication (Invite @ Voice) directed to the UE. In Step S502, the S-CSCF sends the terminating signal for voice communication (Invite) to an SCC-AS (Service Centralization and Continuity Application Server, an application server apparatus) in the IMS.

In Step S503, the SCC-AS sends an inquiry signal to an HSS (Home Subscriber Server, a subscriber management server apparatus).

In Step S504, in response to the inquiry signal, the HSS sends a domain inquiry signal for inquiring about a domain in which the UE is located, to an SGSN (Serving GPRS Support Node, a packet switch) and an MME.

In Step S505, the HSS notifies the SCC-AS of the domain in which the UE is located, by sending the SCC-AS a response signal in response to the inquiry signal described above.

In Step S506, based on the response signal, the SCC-AS determines a domain to which the terminating signal for voice communication directed to the UE should be transferred, and sends the S-CSCF a terminating domain designation signal instructing the S-CSCF to transfer the terminating single for voice communication directed to the UE to the domain thus determined.

In Step S507, via the domain (radio access network) designated by the terminating domain designation signal, the S-CSCF sends the UE a terminating call indication signal indicating reception of the terminating signal for voice communication directed to the UE.

PRIOR ART DOCUMENTS

Non-Patent Documents

Non-patent Document 1: 3GPP TS23.221
Non-patent Document 2: 3GPP TS23.292

SUMMARY OF THE INVENTION

Problem to be Solved by the Invention

It is expected that the mobile communication system described above provides AV (Audio Video) communication to the UE capable of accessing the UTRAN/GERAN and the E-UTRAN.

If the AV communication via IMS cannot be provided in a cell controlled by the E-UTRAN, the UE located in the E-UTRAN needs to be provided with the AV communication in the UTRAN/GERAN using CSFB (CS Fallback).

However, the above-described mobile communication system has a problem that the IMS cannot select a domain to which a terminating signal for AV communication directed to the UE should be transferred.

The present invention has been made in consideration of the above problem, and has an objective of providing a mobile communication method and an application server apparatus in which an IMS can appropriately select a domain to which not only a terminating signal for voice communication directed to a UE but also a terminating signal for AV communication directed to the UE should be transferred.

Means for Solving the Problem

The first aspect of present invention is summarized as a mobile communication method including the steps of: when a call session control server apparatus in an IMS receives a terminating signal directed to a mobile station, sending the terminating signal from the call session control server apparatus to an application server apparatus in the IMS, the terminating signal including call-type information indicating whether the terminating signal is for voice communication or AV communication; sending an inquiry signal including the call-type information from the application server apparatus to a subscriber management server apparatus; and determining, by the application server apparatus, a domain to which the terminating signal is to be transferred, based on the call-type information and a response signal received from the subscriber management server apparatus as a response to the inquiry signal.

The second aspect of present invention is summarized as a mobile communication method including the steps of: when a call session control server apparatus in an IMS receives a terminating signal directed to a mobile station, sending the terminating signal from the call session control server apparatus to an application server apparatus in the IMS, the terminating signal including call-type information indicating whether the terminating signal is for voice communication or AV communication; and determining, by the application server apparatus, that a domain to which the terminating signal is to be transferred is a radio access network supporting circuit switch, when the call-type information included in the terminating signal indicates that the terminating signal is for AV communication.

The third aspect of present invention is summarized as an application server apparatus provided in an IMS, the application server apparatus including: a reception unit configured to receive a terminating signal from a call session control server apparatus in the IMS, the terminating signal directed to a mobile station and including call-type information indicating whether the terminating signal is for voice communication or AV communication; a transmission unit configured to send a subscriber management server apparatus an inquiry signal including the call-type information; and a determination unit configured to determine a domain to which the terminating signal is to be transferred, based on the call-type information and a response signal received from the subscriber management server apparatus as a response to the inquiry signal.

The fourth aspect of present invention is summarized as an application server apparatus provided in an IMS, the application server apparatus including: a reception unit configured to receive a terminating signal from a call session control server apparatus in the IMS, the terminating signal directed to a mobile station and including call-type information indicating whether the terminating signal is for voice communication or AV communication; and a determination unit configured to determine that a domain to which the terminating signal is to be transferred is a radio access network supporting circuit switch, when the call-type information included in the terminating signal indicates that the terminating signal is for AV communication.

Effects of the Invention

As described above, the present invention can provide a mobile communication method and an application server apparatus in which an IMS can appropriately select a domain to which not only a terminating signal for voice communication directed to a UE but also a terminating signal for AV communication directed to the UE should be transferred.

MODES FOR CARRYING OUT THE INVENTION

Figure 1:
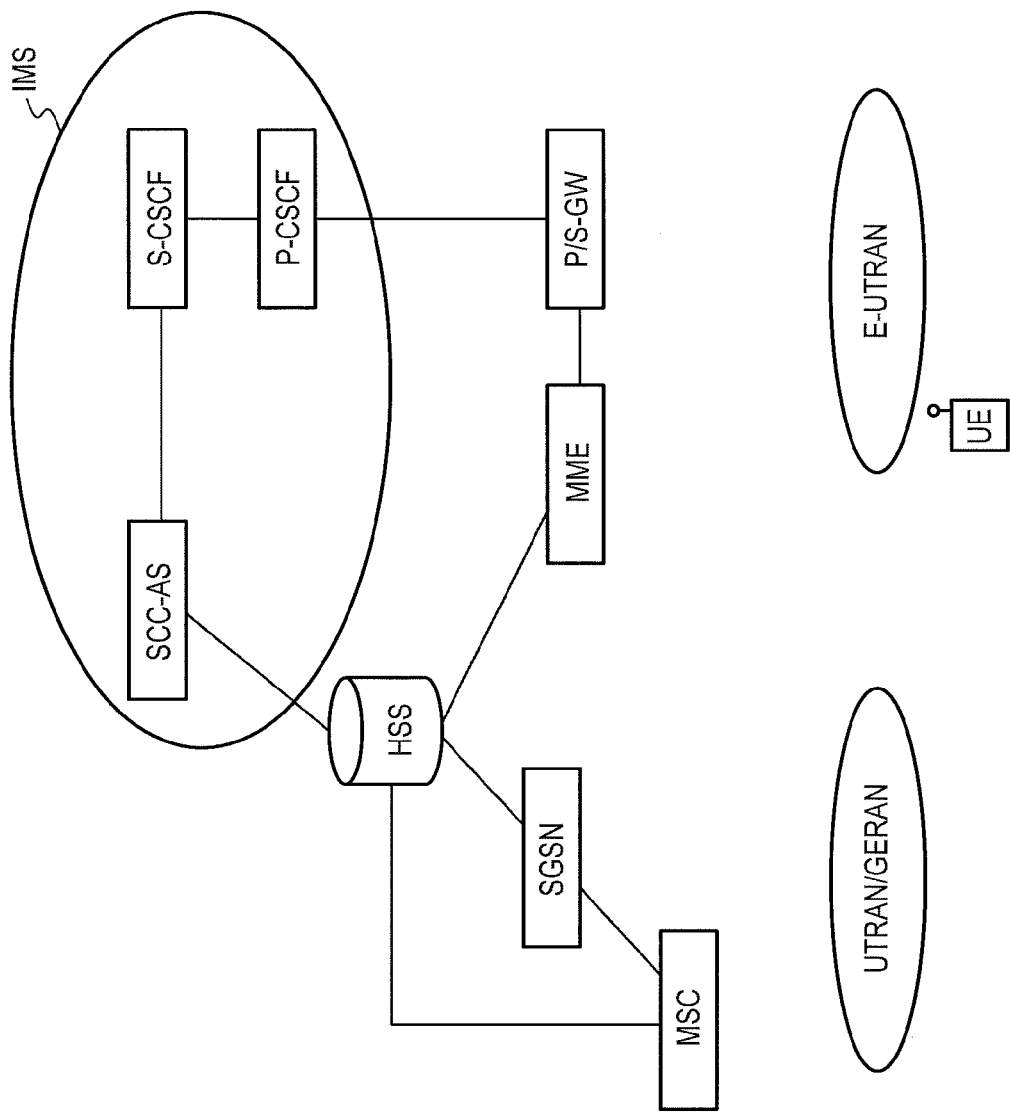
FIG. 1 is a diagram showing the overall configuration of a mobile communication system according to a first embodiment of the present invention.
Figure 2:
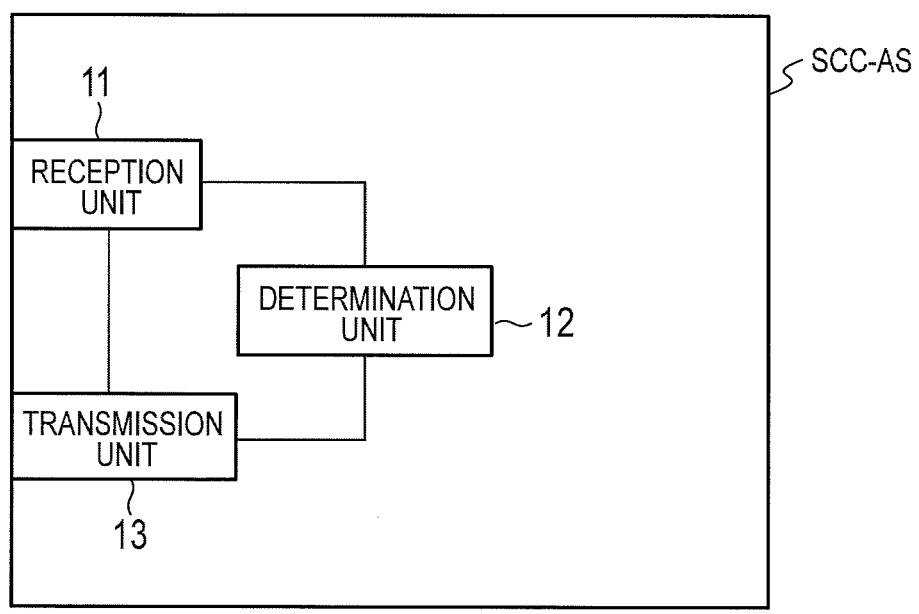
FIG. 2 is a functional block diagram of an SCC-AS according to the first embodiment of the present invention.
Figure 3:
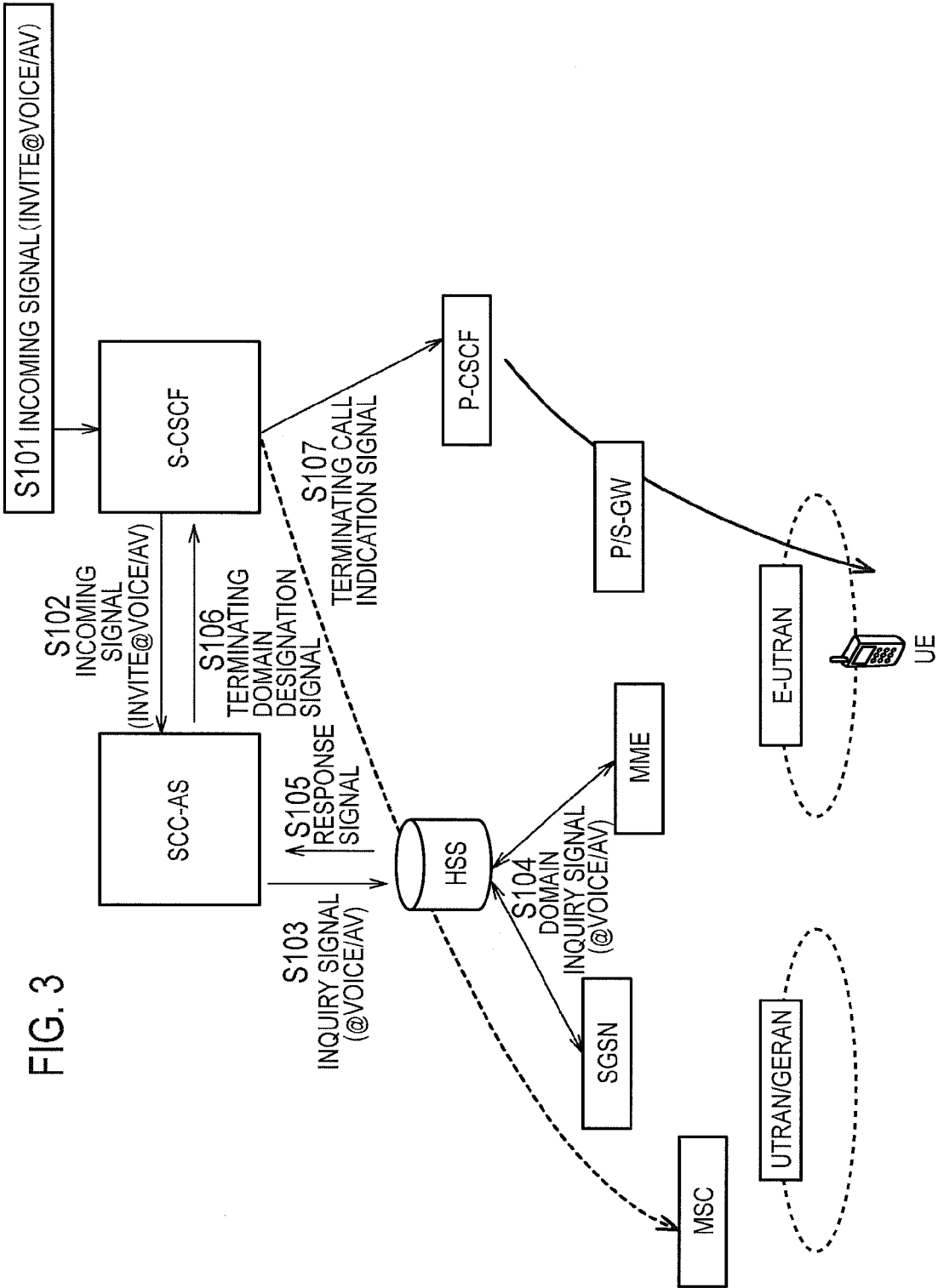
FIG. 3 is a diagram illustrating an operation of the mobile communication system according to the first embodiment of the present invention.
Figure 4:
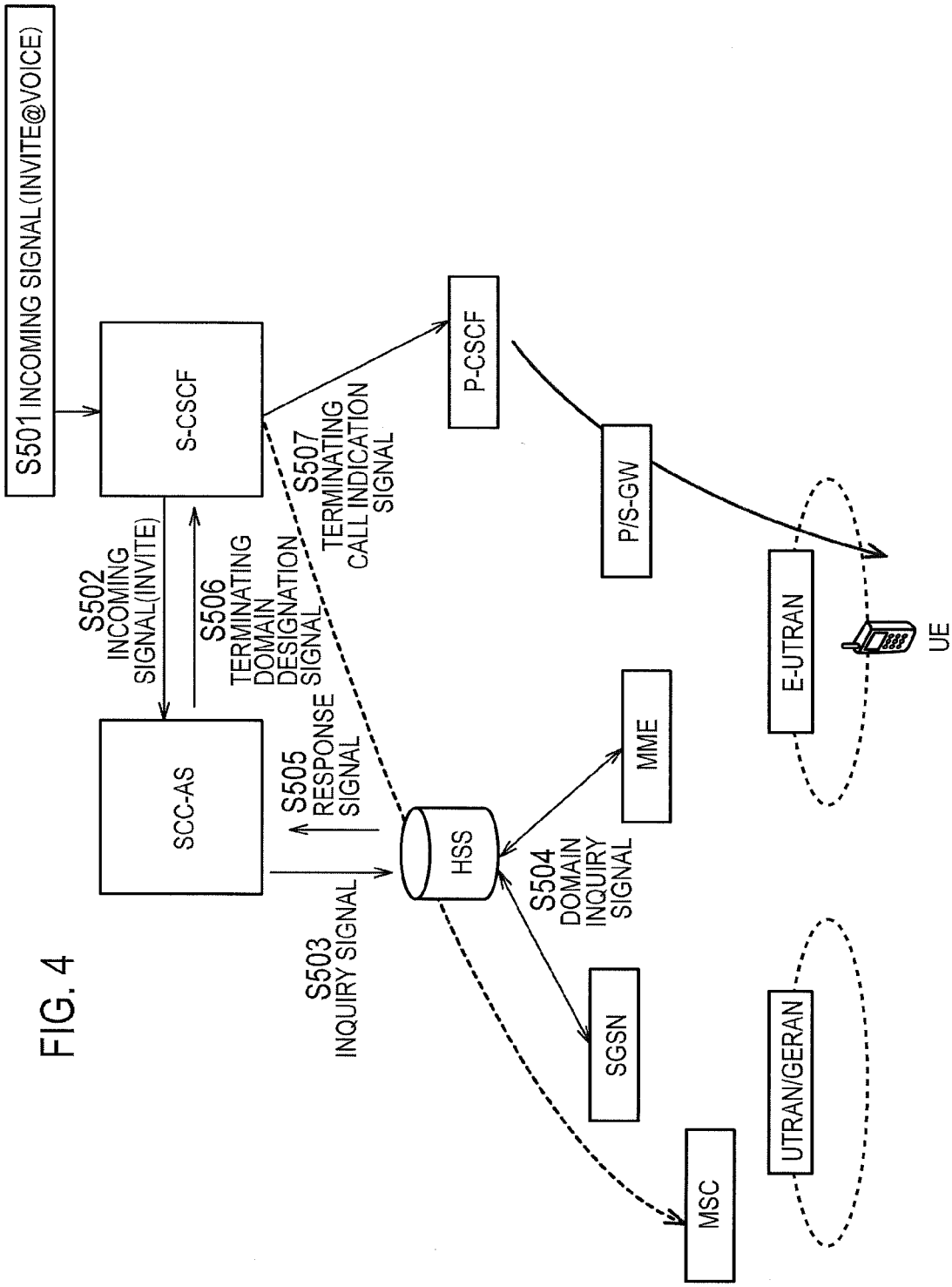
FIG. 4 is a diagram illustrating an operation of a conventional mobile communication system.

Mobile Communication System According to the First Embodiment of the Present Invention With reference to FIGS. 1 to 3, a mobile communication system according to a first embodiment of the present invention is described.

As shown in FIG. 1, the mobile communication system according to this embodiment includes an IMS, an HSS, an SGSN, an MSC (Mobile-service Switching Center, a circuit switch), a UTRAN/GERAN, a P/S-GW, an MME, an E-UTRAN, and the like.

In the IMS, an SCC-AS, an S-CSCF, a P-CSCF (Proxy Call Session Control Function), and the like are located.

A UE shown in FIG. 1 is configured to be able to access both the UTRAN/GERAN and the E-UTRAN.

As shown in FIG. 2, the SCC-AS includes a reception unit 11, a determination unit 12, and a transmission unit 13.

The reception unit 11 is configured to receive a terminating signal for audio communication (Invite @ Voice) directed to the UE and a terminating signal for AV communication (Invite @ AV) directed to the UE.

Moreover, the reception unit 11 is configured to determine whether the terminating signal received is a terminating signal for voice communication or a terminating signal for AV communication, based on call-type information included in the terminating signal. The call-type information is information indicating whether the terminating signal is voice communication or AV communication.

The reception unit 11 is also configured to receive a response signal from the HSS as a response to an inquiry signal to be described later.

The response signal includes information on a domain in which the UE is located, information on whether the UE can support voice communication via IMS or not, information on whether the UE can support AV communication via IMS or not, and the like.

The determination unit 12 is configured to determine a domain to which the terminating signal for voice communication directed to the UE and the terminating signal for AV communication directed to the UE should be transferred, based on the response signal received from the HSS and the call-type information.

For example, the determination unit 12 is configured as follows. Specifically, when determining, based on the above-described response signal, that the UE is located in the UTRAN/GERAN or that the UE is located in a cell controlled by the E-UTRAN which cell does not provide AV communication via IMS, the determination unit 12 determines that the terminating signal for AV communication directed to the UE should be transferred to the UTRAN/GERAN.

On the other hand, when determining, based on the above-described response signal, that the UE is located in the E-UTRAN and that a cell controlled by the E-UTRAN where the UE is located provides AV communication via INS, the determination unit 12 determines that the terminating signal for AV communication directed to the UE should be transferred to the E-UTRAN.

Moreover, when determining, based on the above-described response signal, that the UE is located in the UTRAN/GERAN or that the UE is located in the UTRAN/GERAN or that the UE is located in a cell controlled by the E-UTRAN which cell does not provide AV communication via INS, the determination unit 12 determines that the terminating signal for voice communication directed to the UE should be transferred to the UTRAN/GERAN.

On the other hand, when determining, based on the above-described response signal, that the UE is located in the E-UTRAN and that a cell controlled by the E-UTRAN where the UE is located provides voice communication via IMS, the determination unit 12 determines that the terminating signal for voice communication directed to the UE should be transferred to the E-UTRAN.

The transmission unit 13 is configured to send the HSS an inquiry signal including the call-type information included in the terminating signal received by the reception unit 11.

The transmission unit 13 is also configured to send the S-CSCF a terminating domain designation signal instructing to transfer the terminating signal for voice communication directed to the UE or the terminating signal for AV communication directed to the US to the domain determined by the determination unit 12.

With reference to FIG. 3, a description is given of a specific operation of the mobile communication system according to this embodiment.

As shown in FIG. 3, in Step S101, the S-CSCF receives a terminating signal for voice communication (Invite @ Voice) directed to the UE or a terminating signal for AV communication (Invite @ AV) directed to the UE. Then, in Step S102, the S-CSCF sends the SCC-AS the terminating signal for voice communication (Invite @ Voice) directed to the UE or the terminating signal for AV communication (Invite @ AV) directed to the UE.

In Step S103, the SCC-AS sends the HSS an inquiry signal including the call-type information described earlier.

In Step S104, in response to the inquiry signal, the HSS sends the SGSN and the MME a domain inquiry signal inquiring about a domain in which the UE is located.

In Step S105, the HSS sends the SCC-AS a response signal in response to the inquiry signal.

The response signal includes information on a domain in which the UE is located, information on whether the UE can support voice communication via IMS or not, information on whether the UE can support AV communication via IMS or not, and the like.

In Step S106, based on the response signal, the SCC-AS determines a domain to which the terminating signal for voice communication (Invite@Voice) directed to the UE or the terminating signal for AV communication (Invite@AV) directed to the UE should be transferred, and sends the S-CSCF a terminating domain designation signal instructing to transfer the terminating signal for voice communication (Invite@Voice) directed to the UE or the terminating signal for AV communication (Invite@AV) directed to the UE to the domain thus determined.

In Step S107, via the domain (radio access network) designated by the terminating domain designation signal, the S-CSCF sends the UE a terminating call indication signal indicating reception of the terminating signal for voice communication (Invite@Voice) directed to the UE or the terminating signal for AV communication (Invite@AV) directed to the UE.

In the mobile communication system according to this embodiment, the IMS can select a domain to which not only a terminating signal for voice communication directed to the UE but also a terminating signal for AV communication directed to the UE should be transferred, without impacting the UE.

(Modification 1)

A description is given of a mobile communication system according to Modification 1, focusing on a point different from the mobile communication system according to the first embodiment described above.

In the mobile communication system according to Modification 1, the determination unit 12 of the SCC-AS is configured as follows. Specifically, when the call-type information included in the terminating signal directed to the UE received by the reception unit 11 indicates that the terminating signal is for AV communication, the determination unit 12 determines, without sending the HSS the inquiry signal, that the UTRAN/GERAN is a domain to which the terminating signal should be transferred.

Aspects of the embodiment described above may be represented as follows.

A first aspect of the embodiment is summarized as a mobile communication method including the steps of: when an S-CSCF (call session control server apparatus) in an IMS receives a terminating signal directed to a UE (mobile station), sending the terminating signal from the S-CSCF to an SCC-AS (application server apparatus) in the IMS, the terminating signal including call-type information indicating whether the terminating signal is for voice communication or AV communication; sending an inquiry signal including the call-type information from the SCC-AS to an HSS (subscriber management server apparatus); and determining, by the SCC-AS, a domain to which the terminating signal is to be transferred, based on the call-type information and a response signal received from the HSS as a response to the inquiry signal.

A second aspect of the embodiment is summarized as a mobile communication method including the steps of: when an S-CSCF in an IMS receives a terminating signal directed to a UE, sending the terminating signal from the S-CSCF to an SCC-AS in the IMS, the terminating signal including call-type information indicating whether the terminating signal is for voice communication or AV communication; and determining, by the SCC-AS, that a domain to which the terminating signal is to be transferred is a UTRAN/GERAN (radio access network supporting circuit switch), when the call-type information included in the terminating signal indicates that the terminating signal is for AV communication.

A third aspect of the embodiment is summarized as an SCC-AS provided in an IMS, the SCC-AS including: a reception unit 11 configured to receive a terminating signal from an S-CSCF in the INS, the terminating signal directed to a UE and including call-type information indicating whether the terminating signal is for voice communication or AV communication; a transmission unit 13 configured to send an HSS an inquiry signal including the call-type information; and a determination unit 12 configured to determine a domain to which the terminating signal is to be transferred, based on the call-type information and a response signal received from the HSS as a response to the inquiry signal.

A fourth aspect of the embodiment is summarized as an SCC-AS provided in an IMS, the SCC-AS including: a reception unit 11 configured to receive a terminating signal from an S-CSCF in the IMS, the terminating signal directed to a UE and including call-type information indicating whether the terminating signal is for voice communication or AV communication; and a determination unit 12 configured to determine that a domain to which the terminating signal is to be transferred is a UTRAN/GERAN, when the call-type information included in the terminating signal indicates that the terminating signal is for AV communication.

Note that operations of the above described UE, UTRAN/GERAN, MSC, SGSN, E-UTRAN, MME, S/P-GW, P-CSCF, S-CSCF, SCC-AS, and HSS may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the UE, the UTRAN/GERAN, the MSC, the SGSN, the E-UTRAN, the MME, the S/P-GW, the P-CSCF, the S-CSCF, the SCC-AS, and the HSS. Also, the storage medium and the processor may be provided in the UE, the UTRAN/GERAN, the MSC, the SGSN, the E-UTRAN, the MME, the S/P-GW, the P-CSCF, the S-CSCF, the SCC-AS, and the HSS as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

EXPLANATION OF REFERENCE NUMERALS

UE . . . mobile station
E-UTRAN, UTRAN/GERAN . . . Radio access network
MSC . . . circuit switch
SGSN . . . packet switch
S/P-GW . . . gateway apparatus
MME . . . mobility management node
HSS . . . subscriber management server apparatus
S-CSCF, P-CSCF . . . call session control server apparatus
SCC-AS . . . application server apparatus
11 . . . reception unit
12 . . . determination unit
13 . . . transmission unit

The invention claimed is:

1. A mobile communication method comprising the steps of:
  when a call session control server apparatus in an IP Multimedia Subsystem (IMS) receives a terminating signal directed to a mobile station, sending the terminating signal from the call session control server apparatus to an application server apparatus in the IMS, the terminating signal including call-type information indicating whether the terminating signal is for voice communication or Audio Video (AV) communication; and
  determining, by the application server apparatus, that a domain to which the terminating signal is to be transferred is a radio access network supporting circuit switch, when the call-type information included in the terminating signal indicates that the terminating signal is for AV communication and the AV communication via the IMS cannot be provided.

2. An application server apparatus provided in an IP Multimedia Subsystem (IMS), the application server apparatus comprising:
  a reception unit configured to receive a terminating signal from a call session control server apparatus in the IMS, the terminating signal directed to a mobile station and including call-type information indicating whether the terminating signal is for voice communication or Audio Video (AV) communication; and
  a determination unit configured to determine that a domain to which the terminating signal is to be transferred is a radio access network supporting circuit switch, when the call-type information included in the terminating signal indicates that the terminating signal is for AV communication and the AV communication via the IMS cannot be provided.

* * * * *